W. T. McMILLEN & E. P. CONRICK.

Assignors by mesne Assignment to the Metropolitan Washing Machine Co.

CLOTHES-WRINGER.

No. 7,365. Reissued Oct. 24, 1876.

Witnesses:

C. L. Stetson.
Jno L. Dibble

Inventors:

W. T. McMillen
and E. P. Conrick
by their attorney
C. L. Stetson
New York City

UNITED STATES PATENT OFFICE

WILLIAM T. McMILLEN, OF CINCINNATI, OHIO, AND EDWARD P. CONRICK, OF DUBUQUE, IOWA, ASSIGNORS, BY MESNE ASSIGNMENTS, TO THE METROPOLITAN WASHING MACHINE COMPANY.

IMPROVEMENT IN CLOTHES-WRINGERS.

Specification forming part of Letters Patent No. 56,591, dated July 24, 1866; reissue No. 7,365, dated October 24, 1876; application filed September 12, 1875.

*To all whom it may concern:*

Be it known that we, WILLIAM T. McMILLEN, of Cincinnati, Hamilton county, State of Ohio, and EDWARD P. CONRICK, of Dubuque, Iowa, have invented certain new and useful Improvements in Clothes-Wringing Machines; and we do hereby declare the following to be a full, clear, and exact description thereof, reference being had to the accompanying drawings, making part of this specification.

We have devised means for gearing the rollers in such a manner as to give an increase of leverage for the operator, and to relieve the rolls of the greater part of the twisting strain common to this class of machines. Also for arranging movable bearings so that the driving-pinion and its connecting-gear will always remain in the same relative position to each other.

Figure 1:
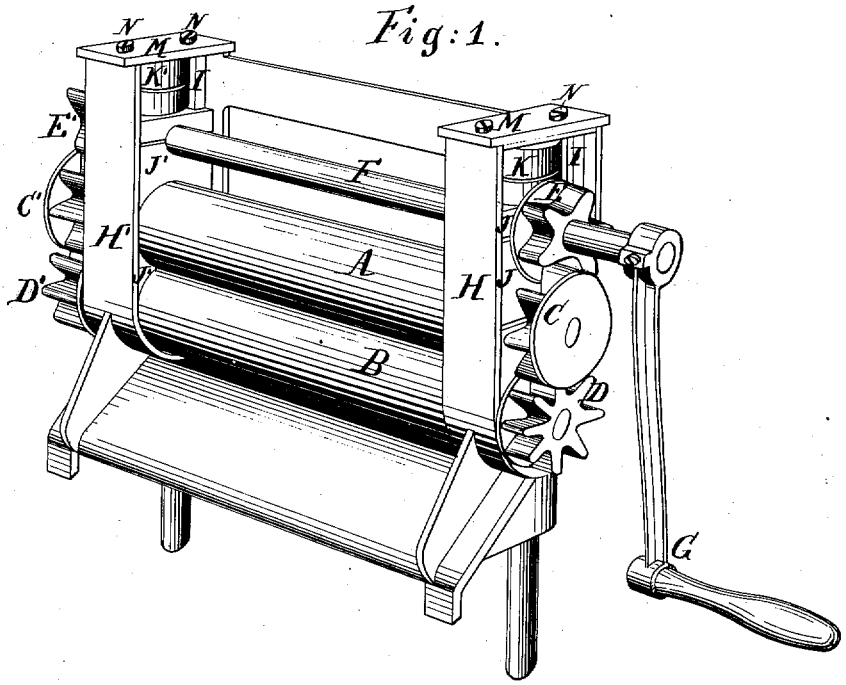
Figure 2:
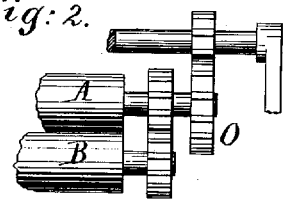

In the accompanying drawings, Figure 1 is a perspective view of a clothes-wringer embodying our invention. Fig. 2 is a modification of the same.

A and B are respectively the upper and lower rolls of the wringer, geared together at both ends by pinions C C′ and D D′, and operated by connection at both ends with the pinions E E′ on the counter-shaft F. The shaft F is operated by the ordinary handle G. The rolls and counter-shaft are journaled in suitable housings, H H′, which are provided with slides I I, on which the boxes J J′ slide. K K′ are rubber springs, kept in place by straps and bolts M M N.

We have ascertained by careful experiments that by gearing the rolls at both ends they can be operated with much greater ease, and with little twisting strain of the gum on the shaft.

In the wringer-machines now in use the torsion of the gum is so great that the roller to which the power is applied is so much twisted as to shortly become loose on the shaft, and of course useless.

As the gum rollers are much the most expensive parts of the machine, their durability is quite an object.

By the use of the counter-shaft F and the purchase-pinions E $E^1$—that is, pinions of smaller diameter than the pinions on the roller-shafts—an increase of mechanical power or leverage is gained over the rollers, and thick heavy articles, such as bed-quilts, can be run through the machine with great ease.

In the modification, Fig. 2, an additional pinion, O, is secured to the shaft of the roller A, and meshes into a suitable pinion on the counter-shaft F. By this device a still greater leverage can be obtained over the rollers, as the wheel *o* can be of larger diameter than the pinions of the rollers.

Though the device as exhibited in Fig. 1 is the preferred type of our invention, we do not desire to restrict ourselves to this precise form. A modification may be made by gearing the rollers together, and with the counter-shaft at one end only.

The term "upper roll" is here used to describe the roll which moves to and from its mate, whether it be directly above or in variously-modified positions.

We claim herein as new and of our invention—

1. The combination, in a clothes-wringer with elastic-rubber rolls, of a purchase driving-pinion, either at one or both ends of the mechanism, supported in bearings, arranged to rise and fall vertically with the upward and downward motion of the movable roll.

2. The combination, in a clothes-wringer having elastic-rubber rolls, of a purchase-pinion at one end, mounted on a bearing or bearings moving vertically with the movable roll, and meshing into and driving a cog-wheel of larger size fixed to the shaft of the movable roll.

In testimony whereof we have hereunto set our names.

WILLIAM T. McMILLEN.
EDWARD P. CONRICK.

Witnesses to the signature of McMILLEN:
W. S. BACON,
CHAS. W. PINNEY.

Witnesses to the signature of CONRICK:
M. M. CADY,
GEO. MEBULING.